(12) United States Patent
Lee et al.

(10) Patent No.: US 7,911,347 B2
(45) Date of Patent: Mar. 22, 2011

(54) PROTECTIVE GUARDS FOR MOUNTING AN IDENTIFICATION TAG ON A SHOPPING CARRIER

(75) Inventors: Morris Lee, Palm Harbor, FL (US); Rafael Alonso, Tampa, FL (US); John G. McGill, Naperville, IL (US); John C. Peiffer, New Port Richey, FL (US); Ken Shirilla, Tampa, FL (US)

(73) Assignee: The Nielsen Company (US), LLC, Schaumburg, IL (US)

( * ) Notice: Subject to any disclaimer, the term of this patent is extended or adjusted under 35 U.S.C. 154(b) by 355 days.

(21) Appl. No.: 12/239,245

(22) Filed: Sep. 26, 2008

(65) Prior Publication Data

US 2010/0078902 A1    Apr. 1, 2010

(51) Int. Cl.
*G08B 13/14* (2006.01)
(52) U.S. Cl. .................................. 340/572.8; 340/568.5
(58) Field of Classification Search ................ 340/572.8, 340/572.1, 568.5, 693.5, 693.9; 362/186
See application file for complete search history.

(56) References Cited

U.S. PATENT DOCUMENTS

| | | | |
|---|---|---|---|
| 4,545,591 A | 10/1985 | Balha | |
| 5,986,562 A | 11/1999 | Nikolich | |
| 6,307,517 B1 | 10/2001 | Lee | |
| 6,911,908 B1 | 6/2005 | Beart | |
| 7,088,249 B2 | 8/2006 | Senba et al. | |
| 7,225,980 B2 | 6/2007 | Ku et al. | |
| 7,242,300 B1 | 7/2007 | Konstad et al. | |
| 7,295,132 B2* | 11/2007 | Steiner | 235/383 |
| 7,317,387 B1 | 1/2008 | Cova et al. | |
| 7,443,295 B2* | 10/2008 | Brice et al. | 340/568.5 |
| 7,617,976 B2* | 11/2009 | Silverbrook et al. | 235/383 |
| 7,648,068 B2* | 1/2010 | Silverbrook et al. | 235/383 |
| 7,660,747 B2* | 2/2010 | Brice et al. | 705/26 |
| 2004/0238623 A1 | 12/2004 | Asp | |
| 2006/0259346 A1* | 11/2006 | Williamson | 340/568.5 |
| 2008/0243626 A1* | 10/2008 | Stawar et al. | 705/23 |

FOREIGN PATENT DOCUMENTS

DE     003802354     8/1988

* cited by examiner

*Primary Examiner* — John A Tweel, Jr.
(74) *Attorney, Agent, or Firm* — Hanley, Flight & Zimmerman, LLC

(57) ABSTRACT

A housing for mounting an identification tag to a shopping carrier is disclosed. An example housing includes a base for mounting the housing to the shopping carrier and a guard cover for protecting the identification tag. The guard cover includes a plurality of sidewalls extending from the base plate and a top wall extending between the sidewalls, the sidewalls and the top wall bounding an interior having an opening. The identification tag is mounted at least partially inside the interior of the guard cover.

20 Claims, 11 Drawing Sheets

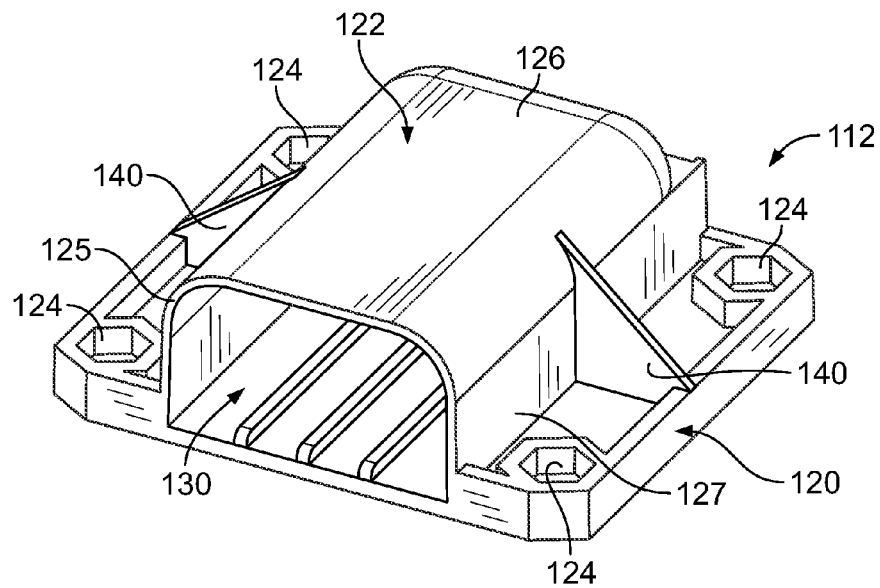
FIG. 5
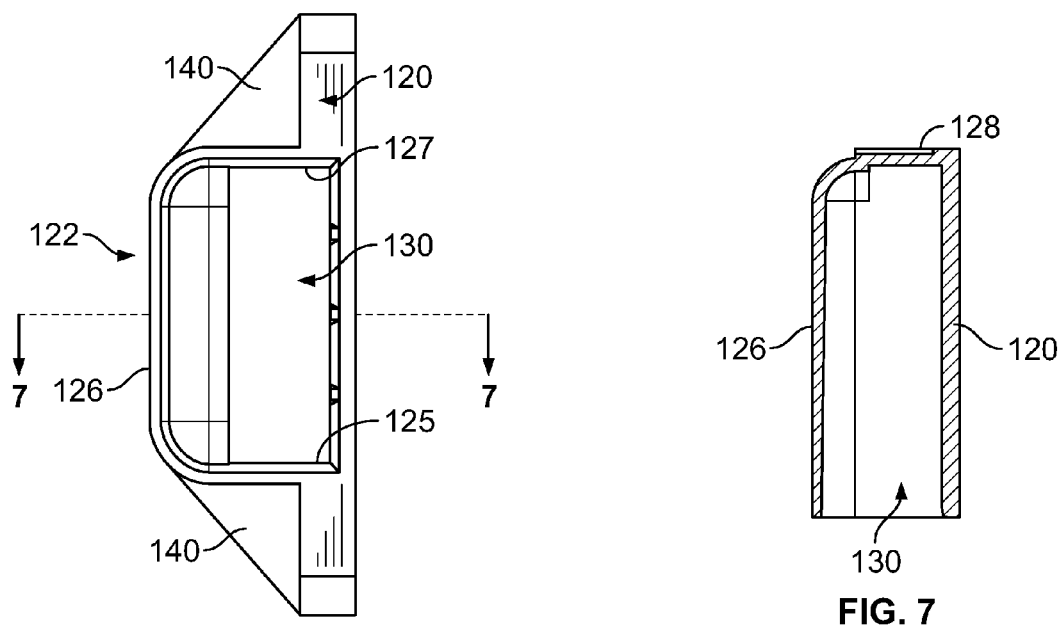
FIG. 6
FIG. 7

PROTECTIVE GUARDS FOR MOUNTING AN IDENTIFICATION TAG ON A SHOPPING CARRIER

FIELD OF THE DISCLOSURE

The present disclosure relates generally to shopping carriers and in particular to protective guards for mounting an identification tag on a shopping carrier.

BACKGROUND

Retail establishments and product manufacturers are often interested in the shopping activities, behaviors, and/or habits of people in a retail environment. Consumer activity related to shopping can be used to correlate product sales with particular shopping behaviors and/or to improve placements of products, advertisements, and/or other product-related information in a retail environment. Known techniques for monitoring consumer activities in retail establishments include conducting surveys, counting patrons, and/or conducting visual inspections of shoppers or patrons in the retail establishments.

Acquiring information related to shopping activities, behaviors, and/or habits of people in a retail environment enables retail establishments to arrange their stores and product layouts in a manner that is most conducive to maximizing sales of such products by positively influencing shoppers. Acquiring such information also enables product manufacturers to design product packaging that influences shoppers exhibiting certain behaviors or shopping patterns and/or to design different product packaging to target different shopper behaviors, patterns, or habits associated with different geographic areas. Advertisers can also benefit from metering shopping activities, behaviors, and/or habits of people in a retail environment by using such information to create more effective advertisements and/or position advertisements in more opportune locations within different retail establishments. In addition, advertisers can assess which advertisements are more effective than others.

BRIEF DESCRIPTION OF THE DRAWINGS

FIG. 5 is a bottom perspective view of an example housing of the example protective guard of FIG. 2.

FIG. 6 is a bottom side view of the example housing of FIG. 5.

FIG. 7 is a cross sectional view of the example housing of FIG. 5, taken along line 7-7 of FIG. 6.

DETAILED DESCRIPTION

In one example, an identification tag, such as, for example, a broadcast identification tag may be used to monitor shopper activities in the retail environment. In particular, in one example, an identification tag is attached to a mobile shopping carrier, such as, for example, a shopping cart or a shopping basket, and is adapted to emit a wireless signal in response to either movement of the shopping carrier, at predefined intervals, or as otherwise desired. As a consumer utilizes the shopping carrier within the retail environment, the identification tag emits a signal that is translated into relevant information regarding the position of the particular shopping carrier and, accordingly, the shopper.

Because the example identification tag is attached to a mobile shopping carrier, it may be subjected to significant wear and tear, which may compromise the tag and/or the emitted signal, thus affecting the data collected via the tag. For example, the shopping carrier and thus, the tag, is typically subjected to movement, bumping, collisions, weather, etc., and the electronics located within the identification tag may be damaged as a result. Accordingly, a protective guard is disclosed that is utilized protect the identification tag from the shopping environment.

Figure 1:
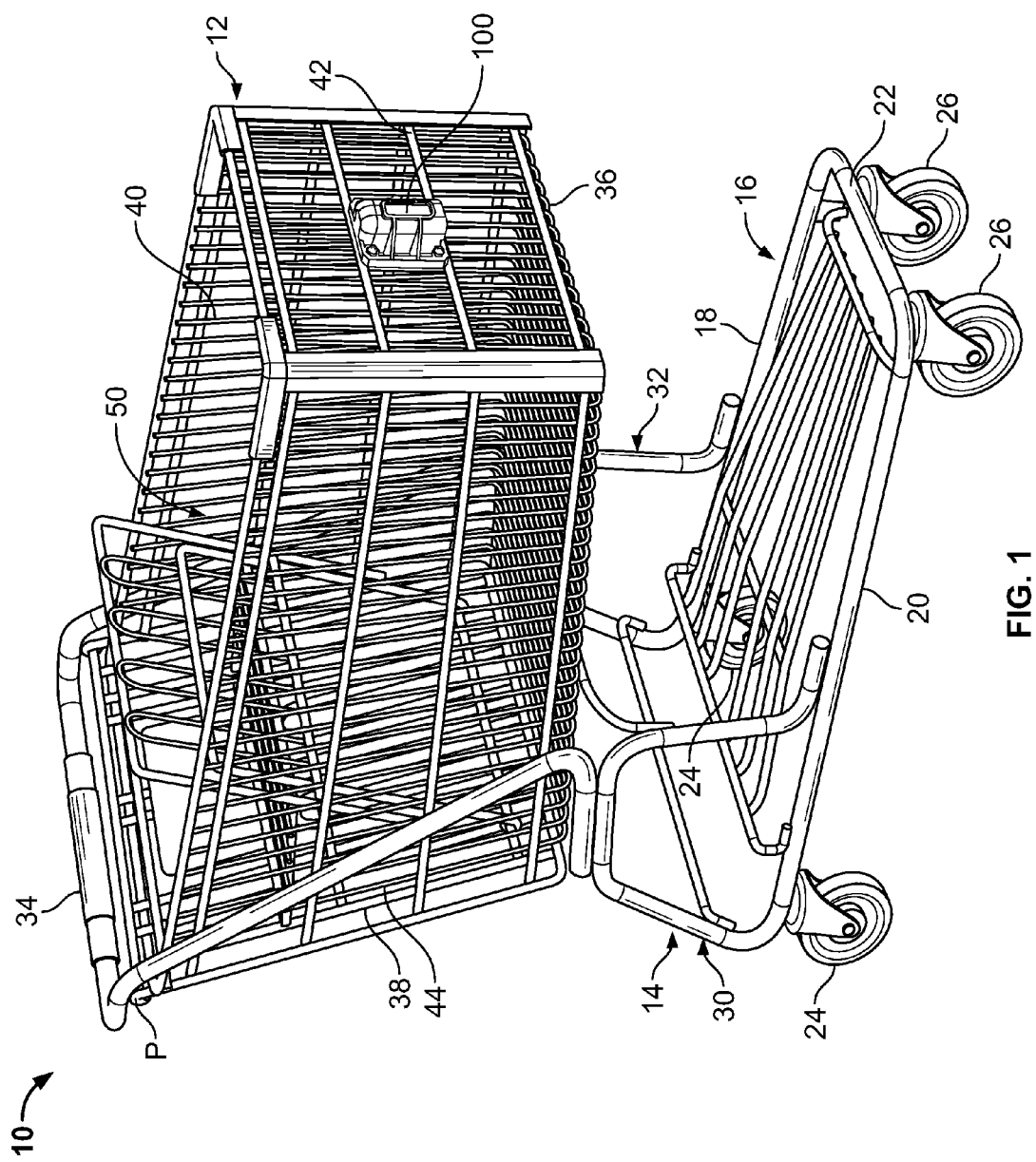
FIG. 1 is a right side, front perspective view of an example protective guard mounted on an example shopping cart.

Referring to FIG. 1, an example shopping carrier is shown. In this example, the shopping carrier is a shopping cart 10. The shopping cart 10 may be any type or design. The example shopping cart 10 generally includes a basket 12 attached to a frame 14. The frame 14 includes a base 16, having side base members 18, 20, and a front base member 22 extending between the side base members 18, 20 at a front of the cart 10. The base 16 also includes a pair of rear wheels 24, and a pair of front wheels 26 for aiding in the movement of the cart 10 over a support surface. The frame 14 also includes side members 30, 32 extending vertically upward from the base 16 on each side of the cart 10. The side members 30, 32, support a handle 34 extending upward and between the side members 30, 32.

The basket 12 includes a floor 36, a pair of sidewalls 38, 40, a front wall 42, and a rear wall 44. Together, the floor 36, sidewalls 38, 40, front wall 42, and the rear wall 44 define a cargo area 50 open at the top. The example rear wall 44 is pivotable about an axis P such that a lower end of the rear wall 44 swings upward into the cargo area 50 of the basket 12 to receive the front wall 42 of another cart 10, thereby allowing the carts 10 to be nested for storage. As illustrated, a protective guard 100 is mounted to the cart 10. In this example, the protective guard 100 is mounted to the front wall 42, and houses an identification tag 110 (FIG. 3) as will be described below.

In this example, the cart 10 is generally formed of metal. For example, the illustrated basket 12 is formed from a plurality of discrete metal wires coupled in a grid-like structure. The cart 10, however, may be made from any suitable material, including, for example, metal sheets, plastic, or any combination of materials. Furthermore, the cart 10 may be any shape, size, or design and may be stored, pivoted, and/or nested in any suitable fashion. Additionally, while the protective guard 100 is illustrated as mounted to the front wall 42, the guard 100 may be mounted to any structure and/or surface of the cart 10.

Referring now to FIGS. 2-8, the example protective guard 100 is shown in greater detail. In this example, the protective guard 100 includes a housing 112 mounted to the front wall 42 of the shopping cart 10. In one example, the housing 112 is mounted to the cart 10 by a mounting plate 114 operatively coupled to the housing 112 with plurality of fasteners 116, such as, for instance, a plurality of screws and corresponding nuts. In this example, housing 112 is located on an exterior surface of the front wall 42 and the mounting plate 114 is located on an interior surface of the front wall 42 extending into the cargo area 50. Therefore, the fasteners 116 extend through the front wall 42, such as, for example, through the openings formed between the grids of the front wall 42.

The example housing 112 includes a base 120 and a guard cover 122. Specifically, the example base 120 is generally square shaped and includes a plurality of apertures 124 formed therethrough and adapted to retain a portion of the fasteners 116. In this example, there are four apertures 124 located proximate each corner of the base 120. The number and location of the apertures 124, however, may vary as desired.

The example guard cover 122 is integrally formed with the base 120 and extends outward and generally perpendicular from the surface of the base 120. In particular, the example guard cover 122 includes three sidewalls 125, 126, 127, and a top wall 128 extending between the sidewalls 125, 126, 127 at an end of the sidewalls 125, 126, 127 located distantly from the base 120. Together, the sidewalls 125, 126, 127 and top wall 128 form an interior 130 open at a side and sized to accept the identification tag 110. In this example, the identification tag 110 is an ultrasound broadcast tag marketed by SONITOR® Technologies, Inc., Largo, Fla. Also in this example, the interior 130 is designed to open toward the ground or surface supporting the cart 10.

Figure 2:
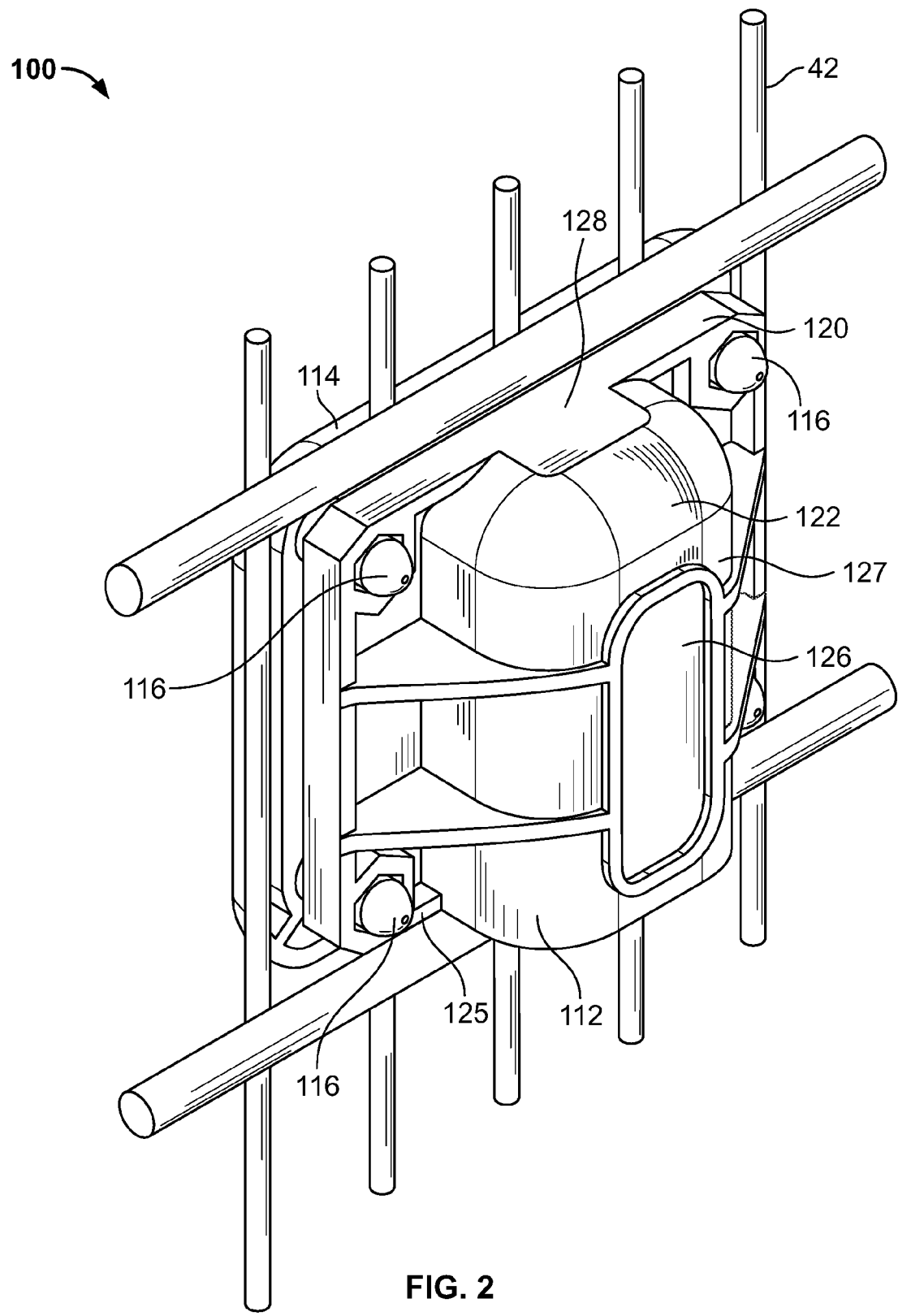
FIG. 2 is a right side, front perspective view of the example protective guard of FIG. 1, showing the example protective guard in greater detail.
Figure 3:
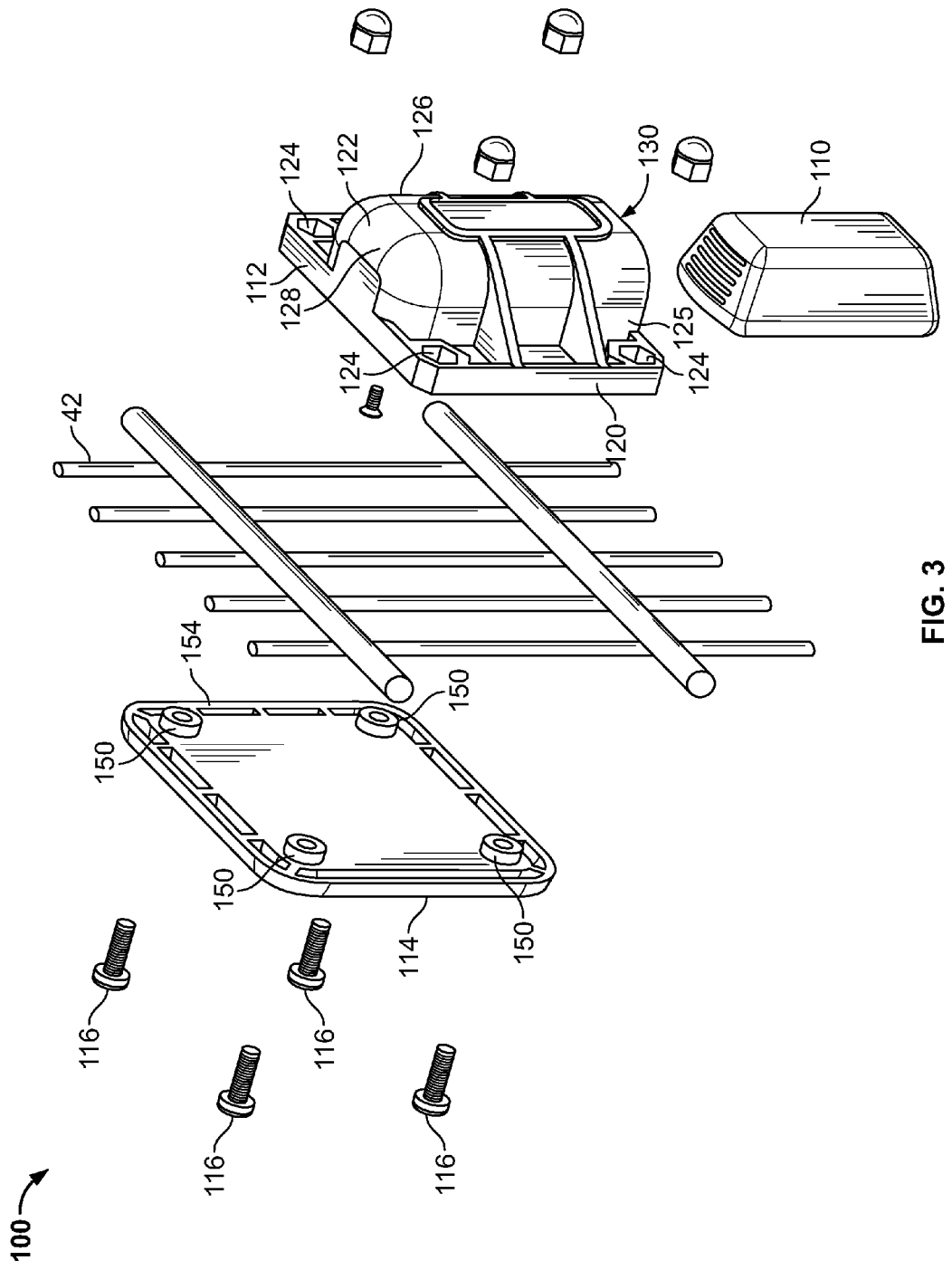
FIG. 3 is an exploded right side, front perspective view of the example protective guard of FIG. 2.
Figure 4:
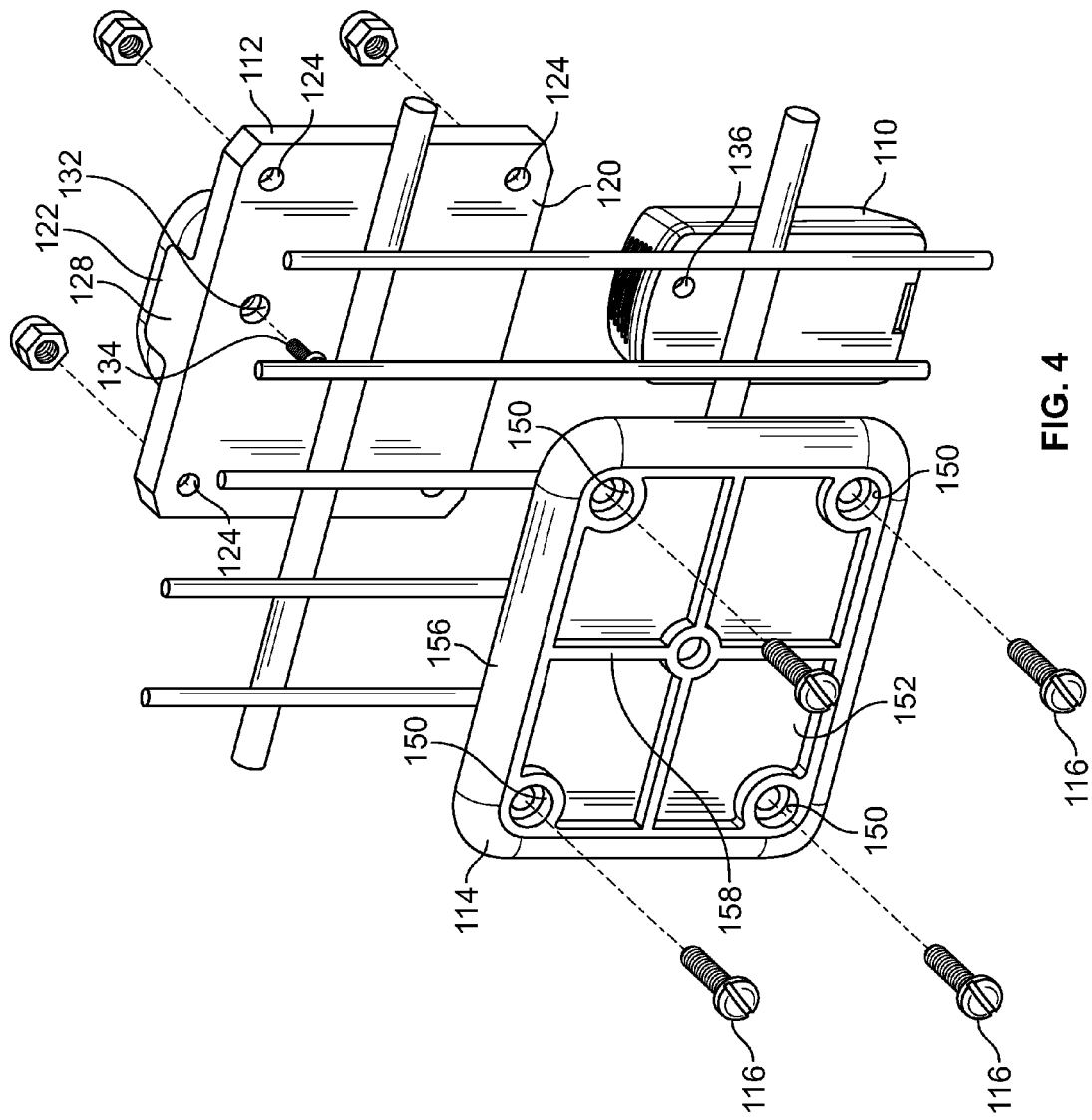
FIG. 4 is an exploded right side, rear perspective view of the example protective guard of FIG. 2.
Figure 8:
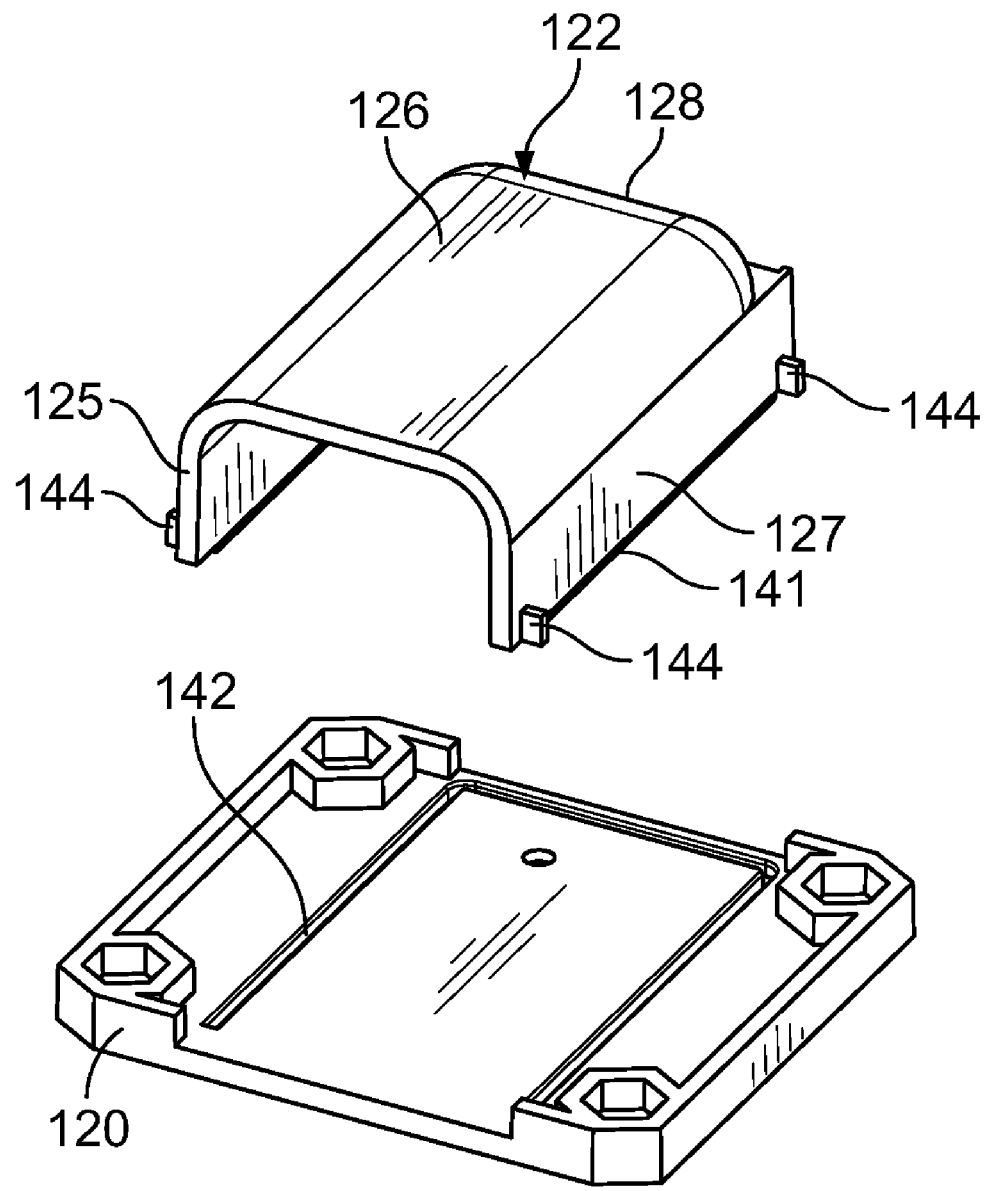
FIG. 8 is an exploded bottom perspective view of another example housing of the example protective guard of FIG. 2.

In the example housing 112 shown in FIGS. 2-8, the sidewalls 125, 126, 127, and the top wall 128 are integrally formed with the base 120. However, as will be described, the sidewalls 125, 126, 127, and the top wall 128 may be separately formed and coupled as desired. The illustrated containment shell or housing 112 also includes a plurality of ribs 140 extending between the base 120 and the sidewalls 125, 126, 127. The ribs 140 may provide structural strength to the guard cover 122. Any number of ribs 140 may be utilized. For example, as illustrated in FIGS. 2-4, two ribs 140 are located on each of the sidewalls 125 and 127, while as illustrated in FIGS. 5-7 one rib 140 is located on each of the sidewalls 125 and 127. In some examples, more or fewer ribs 140 may be utilized as desired. Additionally, the location of the ribs 140 may be varied. Any other structural device may be used as desired.

The housing 112 also includes another aperture 132 defined through the base 120 for mounting the identification tag 110 to the housing 112. A fastener 134 aligns with the aperture 132 and mates with an aperture 136 formed in the identification tag 110. Thus, the fastener 134 mounts the identification tag 110 to the housing 112 within the interior 130. In this example, the fastener 134 is a screw having threads that mate with corresponding threads located within the aperture 136 of the identification tag 110. However, the fastener 136 may be any suitable permanent or semi-permanent fastening device, including, for example, adhesives, nails, pressure fittings, etc.

As noted above, and as illustrated in FIG. 8, the housing 112 may be separately formed from a multitude of components. Specifically, in the illustrated example, the guard cover 122 and the base 120 are separately formed and coupled together. In this example, the guard cover 122 includes the sidewalls 125, 126, 127, and the top wall 128 integrally formed with each other, but separately formed from the base 120. The example guard cover 122 includes a lip 141 extending around the perimeter of the sidewalls 125, 126, 127, and adapted to mate with a groove or channel 142 formed in the surface of the base 120. In this example, a plurality of alignment extensions 144 are provided to align and/or secure the lip 141 of the guard cover 122 to the channel 142 of the base 120.

As noted above, the housing 112 is, in the illustrated example, mounted to the front wall 42 of the cart 10 by the mounting plate 114. The housing 112 may, however, be mounted to the cart 10 by any suitable mounting device including, for instance, ties, clips, fasteners, adhesives, friction fits, etc.

The example mounting plate 114 is generally square shaped and includes a plurality of apertures 150 for receiving the fasteners 116 therethrough. In this example, the apertures 150 locationally correspond to the apertures 124 found in the base 120 and are, thus, located near each corner of the mounting plate 114. The mounting plate 114 includes a first surface 152 facing the interior of the cargo area 50 and a second surface 154 adapted for placement against the cart 10 and, in particular, the front wall 42. The example first surface 152 includes a perimeter 156 having a rounded profile to minimize interference with any items placed within the cargo area 50. The first surface 152 also includes a plurality of ridges 158 extending from the perimeter 156 towards the interior of the surface 152.

The housing 112 is mounted to the cart 10 by inserting the fasteners 116 through the apertures 150, the front wall 42, and the apertures 124. The fasteners 116 may then be tightened or otherwise seated to secure the housing 112 and the mounting plate 114 to the cart 10. While in this example the fasteners 116 include a screw and corresponding nut, the fasteners may be any type of fastener including, for example, a rivet, adhesive, friction fit, etc.

Figure 9:
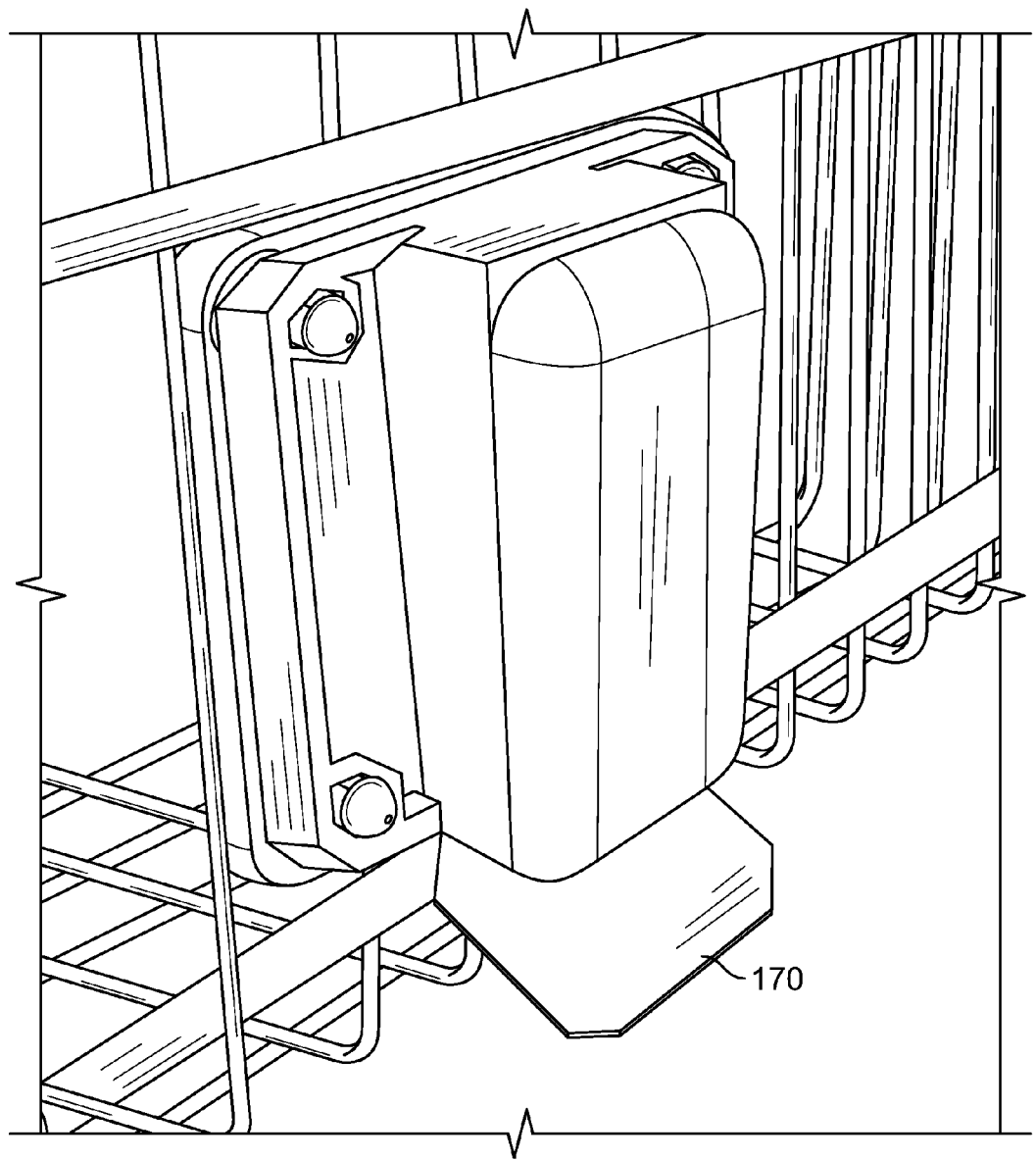
FIG. 9 is a right side, front perspective view of the example protective guard of FIG. 1, showing an example reflector mounted beneath the protective guard.

Referring now to FIG. 9, there is illustrated an example reflector 170 that may be mounted to the housing 112. In particular, because in this example the opening of the interior 130 is located facing downward and because the example identification tag 110 emits a broadcast signal, such as, for example, an ultrasonic signal, the broadcast signal will be broadcast toward the floor under the cart 10. It may be desired, however, to reflect the emitted broadcast signal upward for sensing or other processing. Accordingly, the reflector 170 may be mounted to the housing 112 under, or at least partially obstructing the opening of the interior 130. In this example, the reflector 170 is a generally flat, generally rectangular piece of material extending from the housing 112 at an angle below the opening of the interior 130. The reflector 170 may be manufactured of any material suitable of reflecting a broadcast wave, such as, for example, metal.

Figure 10:
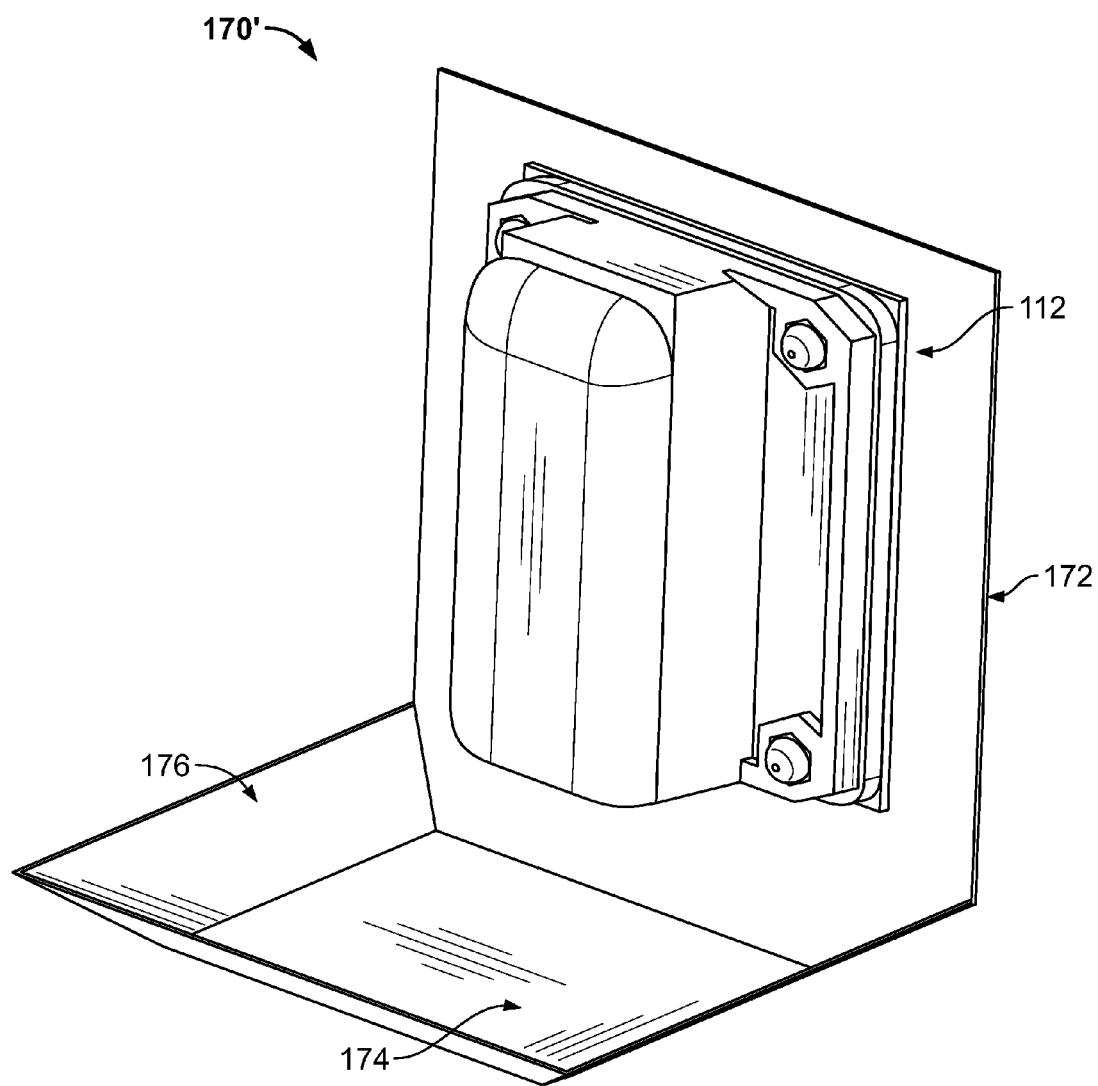
FIG. 10 is a top perspective view of another example reflector for use with the protective guard of FIG. 1.

As illustrated in FIG. 10, in another example, a reflector 170' may alternatively be mounted to the housing 112 to reflect the broadcast signals emitted by the identification tag 110. In this example, the reflector 170' includes a mounting portion 172, and a reflective portion 174. The mounting portion 172 is operatively coupled to the housing 112 under or at least partially covering the opening of the interior 130. The example reflective portion 174 includes at least one uneven surface 176 to reflect the broadcast signal in different directions. While the uneven surface 176 is illustrated as a plurality of flanges extending upward from the plane of the reflection portion 174, the uneven surface may be any shape and/or size, and may be formed in any suitable manner to reflect, direct, and/or concentrate the emitted broadcast signal.

Figure 11:
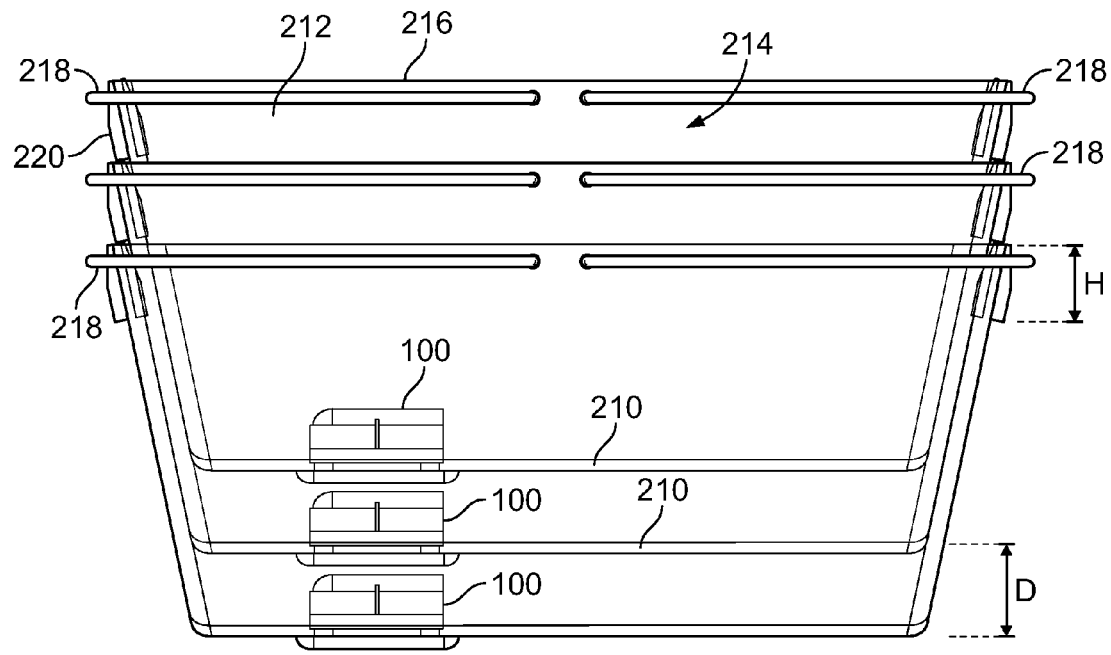
FIG. 11 is a perspective view of an example shopping basket shown in a storage position and including the example protective guard of FIG. 1 and an example standoff.
Figure 13:
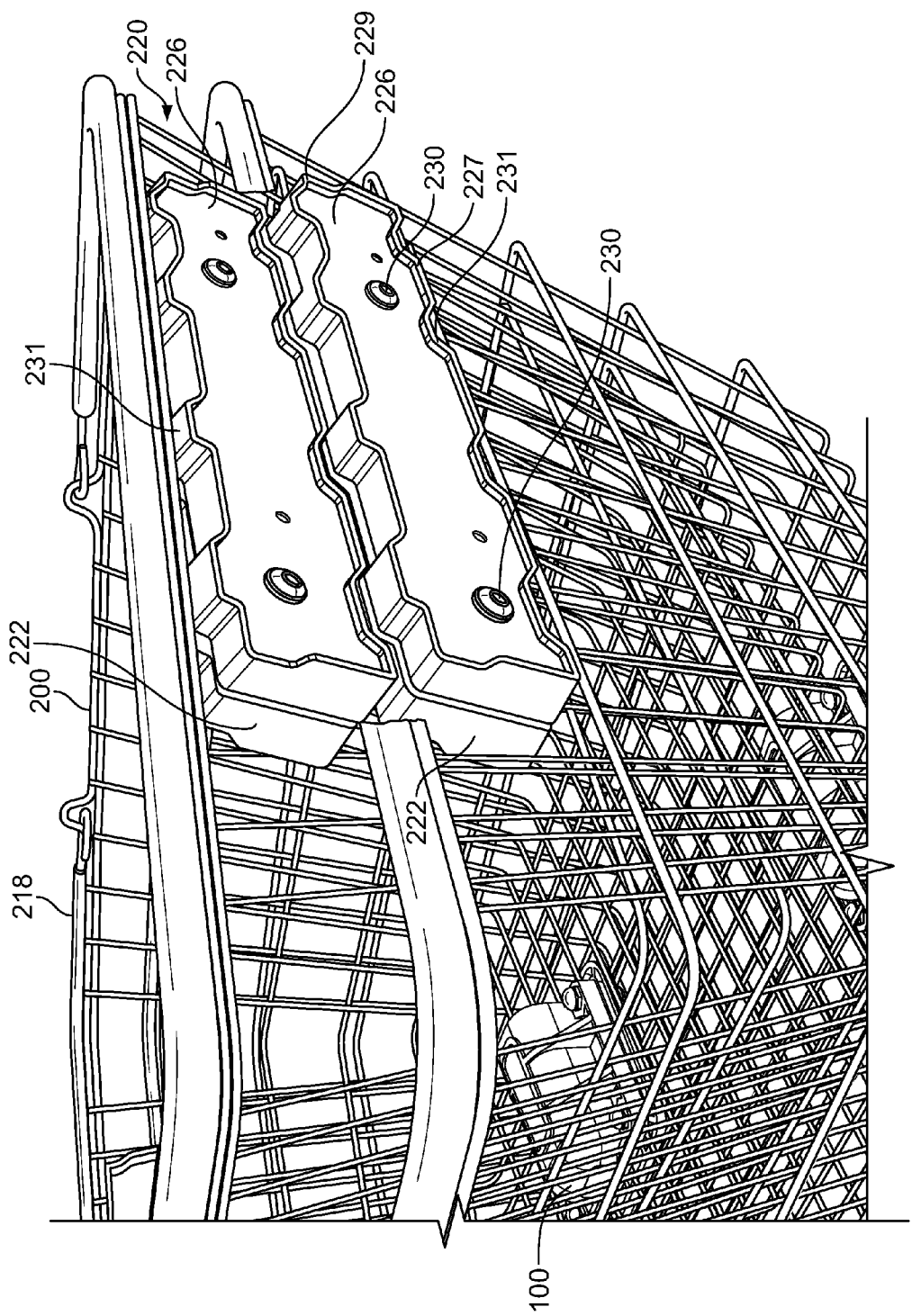
FIG. 13 is a partial perspective view of the example shopping basket of FIG. 11, and including the example standoff of FIG. 11 with an alternate engagement surface.

Turning now to FIGS. 11 and 13, there are illustrated two examples of the protective guard 100 mounted to a plurality of example shopping baskets 200. The example shopping baskets 200 are shown in a stored, or nested position. Turning to one of the baskets 200, the example shopping basket 200 includes a floor 210, and a plurality of sidewalls 212 extending upward from the floor 210 and forming a contiguous perimeter 216 at the top of the sidewalls 212. Together the sidewalls 212 and the floor 210 form a cargo area 214 open at the top and sized for the placement of goods therein. The opening of the example cargo area 214 is sized to receive the floor 210 of another basket 200, thereby allowing the baskets to be securely nested for storage as illustrated. The example shopping basket 200 includes a plurality of handles 218 located near the perimeter 216 for use by a shopper in carrying the basket 200. In this example, the basket 200 is generally formed of metal, such as, for example, a metal mesh structure. The basket 200, however, made be made from any suitable material, including, for example, plastic, or any combination of materials.

In the examples illustrated in FIGS. 11-15, the protective guard 100 is mounted to an interior surface of the floor 210, and is located generally within the cargo area 214. As noted above, the shopping basket 200 is sized to vertically nest with another shopping basket 200 for storage purposes and, accordingly, in this instance, the size of the protective guard 100 interferes with the nesting of two baskets 200. In particular, the floor 210 of a first basket 200 may contact a surface of the protective guard 100 mounted to the floor 210 of a second basket 200 before the first basket 200 is properly and/or fully nested within the cargo area 214 of the second basket 200.

Figure 12:
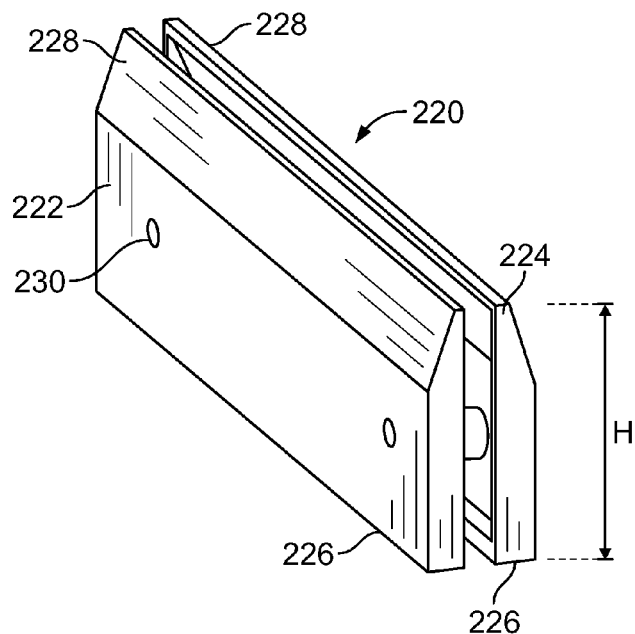
FIG. 12 is a perspective view of the example standoff of FIG. 11.
Figure 15:
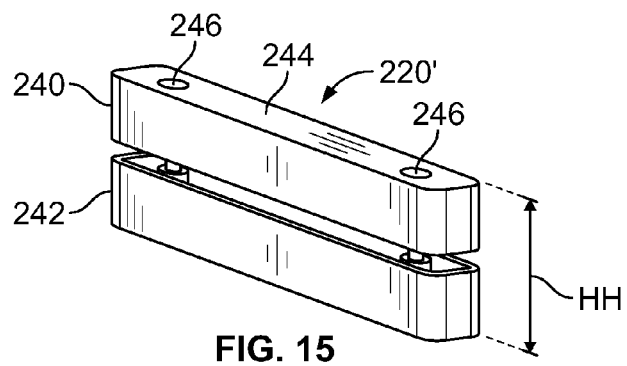
FIG. 15 is a perspective view of the example standoff of FIG. 13.

Accordingly, as illustrated in FIGS. 12, 13, and 15, the example shopping baskets 200 include at least one standoff 220, 220'. In the example illustrated in FIGS. 11 and 12, the standoff 220 is mounted to opposing sidewalls 212 near an upper end of the sidewalls 212, near the perimeter 216. The illustrated standoff 220 includes an inner piece 222 and an outer piece 224, each having an engagement surface 226, a tapered surface 228, and at least one aperture 230 for receiving a fastener (not shown) to couple the inner piece 222 to the outer piece 224 through the corresponding sidewall 212. The fasteners extend through the sidewalls 212, such as, for example, through the open mesh of the sidewall 212 or other aperture, thereby securing the standoff 220 to the basket 200.

As a first basket 200 is nested within the cargo area 214 of a second basket 200, the engagement surface 226 of the outer piece 224 of the standoff 220 mounted to the upper sidewall 212 of the first basket 200 contacts the upper surface of the perimeter 216 of the second basket 200 and rests a height H above the perimeter 216. Thus, the floor 210 of the first basket 200 is elevated a distance D above the floor 210 of the second basket 200, providing clearance between the floor 210 of the first basket 200 and the protective guard 100 mounted to the floor 210 of the second basket 200. The tapered surface 228, in turn, provides a transition or guide to assist in the location of the first basket 200 within the second basket 200.

As illustrated in FIG. 13, the example standoff 220 may alternatively and/or additionally include a keyed and/or nested arrangement to resist lateral movement of one standoff 220 relative to an adjoining standoff 220. For instance, in the illustrated example, the standoff 220 includes an inner piece 222 and an outer piece 224, each having a first engagement surface 227, and a second engagement surface 229. The engagement surfaces 227, 229 have corresponding and reciprocally arranged keys 231, such as for example, valleys, tabs, protrusions, extensions, flanges, or, other suitable device for shape-matingly coupling the engagement surface 227 of the outer piece 224 of the standoff 220 mounted to the upper sidewall 212 of the first basket 200 with the engagement surface 229 of the standoff 220 mounted to the second basket 200.

Figure 14:
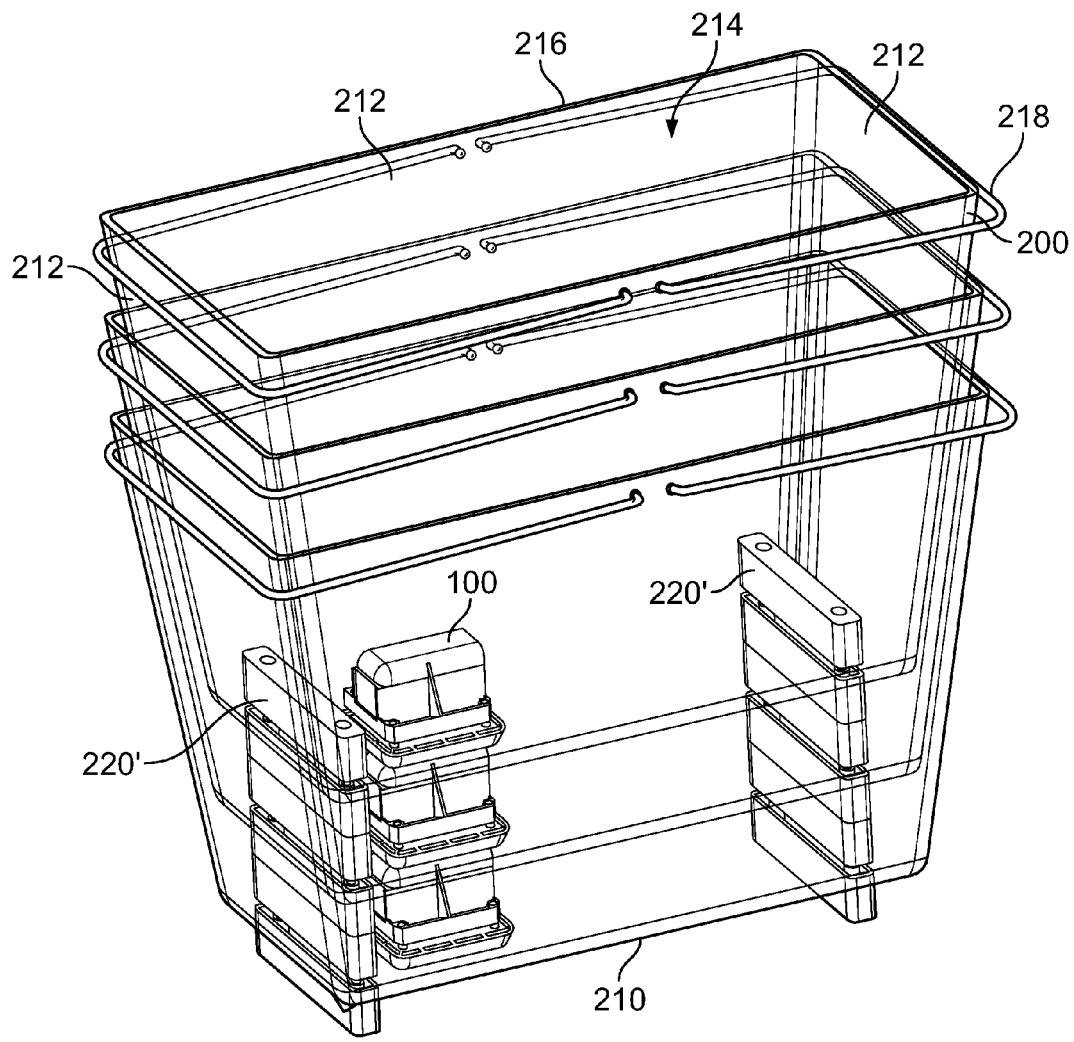
FIG. 14 is a perspective view of the example shopping basket of FIG. 11, and including another example standoff.

In the example illustrated in FIGS. 14 and 15, two standoffs 220' are mounted to the floor 210 of the example basket 200 and are remotely located from one another. In this example, the standoff 220' includes an inner piece 240 and an outer piece 242, each having a contact surface 244, and at least one aperture 246 for receiving a fastener (not shown) to couple the inner piece 240 to the outer piece 242 through the floor 210. The standoff 220' is therefore secured to the basket 200.

In this example, as a first basket 200 is nested within the cargo area 214 of a second basket 200, the contact surface 244 of the outer piece 240 of the standoff 220' mounted to the floor 210 of the first basket 200 contacts the contact surface 244 of the standoff 220' mounted to the floor 210 of the second basket 200. The floor 210 of the first basket 200 thus comes to rests a height HH above the floor 210 of the second basket 200. A clearance between the floor 210 of the first basket 200 and the protective guard 100 mounted to the floor 210 of the second basket 200 is thus created.

The protective guard 100 provides the identification tag 110 with a protective shell, while allowing emitted signals from the identification tag 110 to propagate from within the protective guard 100. The protective guard 100 provides protection from physical damage due to typical use of the shopping carriers, such as, for example, normal use, collisions, etc. The protective guard 100 also provides protection to the identification tag 110 when the shopping carrier is stored, i.e., nested within other shopping carriers. Finally, because the identification tag 110 typically is designed to operate, or emit a signal during detected movement of the identification tag 110, the protective guard 100 provides a stable environment or base for minimizing movement of the identification tag 110 when the shopping carrier is stored.

Although certain example methods and apparatus have been described herein, the scope of coverage of this patent is not limited thereto. On the contrary, this patent covers all methods, apparatus and articles of manufacture fairly falling within the scope of the disclosure either literally or under the doctrine of equivalents.

We claim:

1. A housing for mounting an identification tag to a shopping carrier comprising:
a base for mounting the housing to the shopping carrier; and
a guard cover having a plurality of sidewalls extending from the base and a top wall extending between the sidewalls, the sidewalls and the top wall bounding an interior having an opening, wherein when the identification tag is mounted it is at least partially inside the interior of the guard cover.

2. A housing as defined in claim 1, wherein the identification tag is adapted to broadcast a wireless signal.

3. A housing as defined in claim 2, wherein the wireless signal propagates through the opening in the guard cover.

4. A housing as defined in claim 1, wherein the shopping carrier is a shopping cart.

5. A housing as defined in claim 4, wherein the protective guard is to be mounted to a front wall of the shopping cart.

6. A housing as defined in claim 4, wherein the housing is to be mounted to a surface of the shopping cart and oriented such that the opening in the housing is oriented downward towards a surface upon which the shopping cart is supported.

7. A housing as defined in claim 1, wherein the guard cover is releasably secured to the base.

8. A housing as defined in claim 1, further comprising a rib extending between the base and the guard cover.

9. A housing as defined in claim 1, further comprising a reflector extending at least partially in front of the opening.

10. A housing as defined in claim 9, wherein the reflector includes at least one angled surface.

11. A housing as defined in claim 1, wherein the base is mounted to a first side of a surface of the shopping carrier, and further comprising a mounting plate located on a second side of the surface opposite the first side, and wherein the mounting plate is coupled to the base by a fastener extending through the surface of the shopping carrier.

12. A housing as defined in claim 1, wherein the shopping carrier is a shopping basket including a floor and a plurality of sidewalls extending upward from the floor to form a cargo area having a opening along a perimeter of an upper end of the sidewalls.

13. A housing as defined in claim 12, wherein the housing is to be mounted to the floor of the shopping basket.

14. A housing as defined in claim 13, further comprising a standoff mounted to a first shopping basket proximate to the perimeter and including a lip adapted to contact the perimeter of a second shopping basket when the first shopping basket is nested within the second shopping basket.

15. A housing as defined in claim 13, further comprising a standoff mounted to a first shopping basket proximate to the perimeter and including an engagement surface adapted to contact a corresponding engagement surface of a second standoff mounted to a second shopping basket when the first shopping basket is nested within the second shopping basket.

16. A housing as defined in claim 13, further comprising a standoff mounted to the floor of a first shopping basket and adapted to contact the floor of a second shopping basket when the first shopping basket is nested within the second shopping basket.

17. A protective guard for mounting a broadcast tag to a shopping cart comprising:
 a housing comprising:
  a base for mounting the housing to the shopping cart; and
  a cover having a plurality of walls extending from a surface of the base and defining an interior having an opening wherein the broadcast tag is mounted inside the interior of the cover; and
 a mounting plate coupled to the base by a fastener extending through a surface of the shopping cart.

18. A protective guard as defined in claim 17, further comprising a reflector mounted to the protective guard and extending at least partially in front of the opening.

19. A protective guard as defined in claim 18, wherein the reflector includes at least one angled surface.

20. A guard for mounting an identification tag to a shopping basket comprising:
 a housing having a base for mounting the housing to the shopping basket;
 a cover extending from a surface of the base and having a plurality of walls defining an interior having an opening, wherein the identification tag is to be mounted at least partially within the interior of the housing; and
 a standoff mounted to a surface of the shopping basket and including a surface adapted to contact a portion of a second shopping basket when the shopping basket is stored within the second shopping basket.

* * * * *